United States Patent
Xu et al.

(10) Patent No.: US 10,546,176 B2
(45) Date of Patent: Jan. 28, 2020

(54) OPTICAL FINGERPRINT IDENTIFICATION ASSEMBLY, DISPLAY PANEL AND DISPLAY APPARATUS

(71) Applicant: BOE TECHNOLOGY GROUP CO., LTD., Beijing (CN)

(72) Inventors: Rui Xu, Beijing (CN); Haisheng Wang, Beijing (CN); Chunwei Wu, Beijing (CN); Yingming Liu, Beijing (CN); Pinchao Gu, Beijing (CN); Lijun Zhao, Beijing (CN); Changfeng Li, Beijing (CN); Yanan Jia, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 10 days.

(21) Appl. No.: 15/765,341

(22) PCT Filed: Sep. 21, 2017

(86) PCT No.: PCT/CN2017/102684
§ 371 (c)(1),
(2) Date: Apr. 2, 2018

(87) PCT Pub. No.: WO2018/153078
PCT Pub. Date: Aug. 30, 2018

(65) Prior Publication Data
US 2019/0065810 A1 Feb. 28, 2019

(30) Foreign Application Priority Data
Feb. 27, 2017 (CN) .......................... 2017 1 0107968

(51) Int. Cl.
*G06K 9/28* (2006.01)
*G06K 9/00* (2006.01)
(Continued)

(52) U.S. Cl.
CPC ..... *G06K 9/0004* (2013.01); *G02F 1/133509* (2013.01); *G02F 1/134309* (2013.01)

(58) Field of Classification Search
CPC ............... G06K 9/0004; G06K 9/00006–0012
See application file for complete search history.

(56) References Cited

U.S. PATENT DOCUMENTS

2003/0215117 A1 11/2003 Hata
2004/0208348 A1* 10/2004 Baharav ................ G06F 3/0421
382/124
(Continued)

FOREIGN PATENT DOCUMENTS

CN 101419662 A 4/2009
CN 102081483 A 6/2011
(Continued)

OTHER PUBLICATIONS

First Office Action dated Apr. 2, 2019 corresponding to Chinese application No. 201710107968.8.
(Continued)

*Primary Examiner* — Brian Werner
(74) *Attorney, Agent, or Firm* — Nath, Goldberg & Meyer; Joshua B. Goldberg; Daniel Bissing

(57) ABSTRACT

The present disclosure provides an optical fingerprint identification assembly, a display panel and a display apparatus. The optical fingerprint identification assembly comprises: a light source component configured to provide a light source to illuminate a fingerprint to be identified; a light screening component disposed at a downstream of the light source component in a light path and configured to collimate light emitted from the light source component, reflected by the fingerprint to be identified and entering the light screening component; and a fingerprint identification component disposed at a downstream of the light screening component and configured to receive the light collimated by the light (Continued)

screening component, so as to carry out fingerprint identification. The optical fingerprint identification assembly has the advantages of low cost, compact structure and good identification effect.

20 Claims, 3 Drawing Sheets

(51) Int. Cl.
  *G02F 1/1343* (2006.01)
  *G02F 1/1335* (2006.01)

(56) References Cited

U.S. PATENT DOCUMENTS

2008/0159599 A1* 7/2008 Kajihara ............ G06K 9/00046
  382/115
2017/0220844 A1* 8/2017 Jones .................... G06K 9/0053
2017/0286743 A1* 10/2017 Lee ........................ G02B 5/201

FOREIGN PATENT DOCUMENTS

| | | |
|---|---|---|
| CN | 103729093 A | 4/2014 |
| CN | 105373772 A | 3/2016 |
| CN | 105550664 A | 5/2016 |
| CN | 105589228 A | 5/2016 |
| CN | 105911791 A | 8/2016 |
| CN | 106229331 A | 12/2016 |
| CN | 106462765 A | 2/2017 |
| CN | 106897701 A | 6/2017 |

OTHER PUBLICATIONS

International search report dated Dec. 27, 2017 for corresponding application No. PCT/CN2017/102684 with English translation attached.

* cited by examiner

OPTICAL FINGERPRINT IDENTIFICATION ASSEMBLY, DISPLAY PANEL AND DISPLAY APPARATUS

CROSS-REFERENCE TO RELATED APPLICATION

This is a National Phase application filed under 35 U.S.C. 371 as a national stage of PCT/CN2017/102684, filed on Sep. 21, 2017, an application claiming the priority of Chinese Patent Application No. 201710107968.8 submitted to the Chinese Intellectual Property Office on Feb. 27, 2017, the disclosure of which is incorporated herein in its entirety by reference.

TECHNICAL FIELD

The present disclosure relates the technical field of display technology, and particularly relates to an optical fingerprint identification assembly, a display panel and a display apparatus.

BACKGROUND OF THE INVENTION

In recent years, with people's increasing awareness of privacy protection and challenges in security of funds in the field of mobile payments, biometric identification technology has become extremely hot. Currently, one of the biometric identification technologies widely applied on cellphones is fingerprint identification. By far, fingerprint identification has become one of the standard configurations of middle- and high-end cellphones.

For current cellphone display screens, the optical fingerprint identification function key is mostly disposed at the home key, and the sensor is typically a silicon-based Complementary Metal Oxide Semiconductor (CMOS) or Charge Coupled Device (CCD). Generally, CMOS and CCD can be used to obtain a better fingerprint identification effect. However, CMOS and CCD are usually external custom components, and their integration with display components is not ideal. Meanwhile, the high cost of CMOS and CCD leads to an increase in the cost of the entire display screen without bring any extra value thereto.

Therefore, it is an urgent technical problem to design a low-cost and compact fingerprint identification assembly with a good fingerprint identification effect.

SUMMARY

The present disclosure has been accomplished in order to at least partially solve the problems in the prior art. The present disclosure provides a low-cost and compact optical fingerprint identification assembly with a good fingerprint identification effect, as well as a display panel and a display apparatus.

According to one aspect of the disclosure, there is provided an optical fingerprint identification assembly, comprising:

a light source component configured to provide a light source to illuminate a fingerprint to be identified;

a light screening component disposed at a downstream of the light source component in a light path and configured to collimate light emitted from the light source component, reflected by the fingerprint to be identified and entering the light screening component; and a fingerprint identification component disposed at a downstream of the light screening component and configured to receive the light collimated by the light screening component, so as to carry out fingerprint identification.

The light screening component may include a pair of electrodes and a light deflecting layer, the pair of electrodes includes a first electrode and a second electrode respectively disposed at two sides of the light deflecting layer to provide a light deflection control voltage for the light deflecting layer; and the light reflected by the fingerprint to be identified enters the fingerprint identification component after being adjusted by the light deflecting layer.

The light screening component may further include a light filtering layer disposed closely adjacent to at least one side of the light deflecting layer and between the pair of electrodes, and the light reflected by the fingerprint to be identified is adjusted by the light deflecting layer and enters the fingerprint identification component in a direction perpendicular to a plane where the light filtering layer is located.

The light deflecting layer may be a liquid crystal adjusting layer, the light filtering layer may be an opaque layer with a plurality of openings, the first and second electrodes are configured to control whether to deflect liquid crystal molecules in an area of the liquid crystal adjusting layer corresponding to the first electrode, and the light perpendicular to the plane where the light filtering layer is located enters the fingerprint identification component through the openings.

The fingerprint identification component may include a control element and a photosensitive device connected in series;

the photosensitive device corresponds to at least one of the openings.

The plurality of openings may be arranged in an array, and correspond to a plurality of the photosensitive devices one by one.

The plurality of openings may be arranged in an array, and one of the openings corresponds to a plurality of the photosensitive devices.

The plurality of openings may be arranged in an array, and correspond to one photosensitive device.

The first electrode may have a plurality of strip structures spaced apart and parallel to each other; and the second electrode may have a plane structure.

The light filtering layer may be made of a black insulating material.

One of the first and second electrodes closer to the photosensitive device may be made of a transparent electrode material.

The optical fingerprint identification assembly may further include a first substrate and a second substrate disposed oppositely, the fingerprint identification component is disposed in the second substrate, the pair of electrodes of the light screening component and the light filtering layer are disposed in the first and second substrates, the light deflecting layer of the light screening component is disposed between the first and second substrates, the light source component is disposed outside a side of the first substrate, and the first substrate is configured to guide the light emitted from the light source component entering at the side of the first substrate.

The first electrode, the light deflecting layer, the light filtering layer and the second electrode may be stacked from bottom to top sequentially.

The second electrode, the light deflecting layer, the light filtering layer and the first electrode may be stacked from bottom to top sequentially.

The first electrode, the light filtering layer, the light deflecting layer and the second electrode may be stacked from bottom to top sequentially.

The second electrode, the light filtering layer, the light deflecting layer and the first electrode may be stacked from bottom to top sequentially.

According to another aspect of the disclosure, there is provided a display panel comprising the above mentioned optical fingerprint identification assembly disposed in a non-display area of the display panel.

According to still another aspect of the disclosure, there is provided a display apparatus comprising the above mentioned display panel.

DETAILED DESCRIPTION

To improve understanding of the technical solution of the present disclosure for those skilled in the art, the optical fingerprint identification assembly, display panel and display apparatus of the present disclosure will be described below in detail in conjunction with the accompanying drawings and specific embodiments.

First Exemplary Embodiment

According to one aspect of the disclosure, this exemplary embodiment provides an optical fingerprint identification assembly which solves the technical problems of, for example, the optical fingerprint identification function key of current display component terminals limited to the home key, poor integration of the sensor and the display component, too many spacer layers between the finger and the sensor, and poor fingerprint identification effect.

Figure 1A:
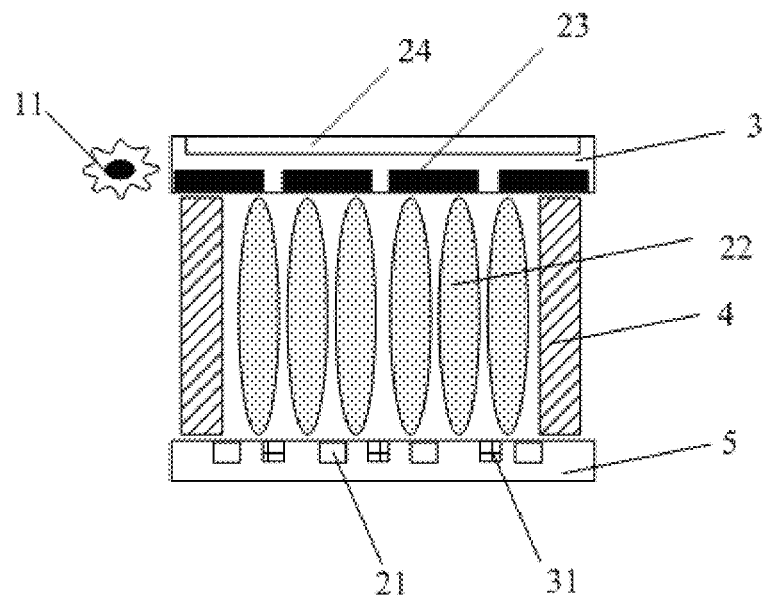
FIGS. 1A and 1B are structural schematic views showing an optical fingerprint identification assembly according to the first exemplary embodiment of the disclosure.
Figure 1B:
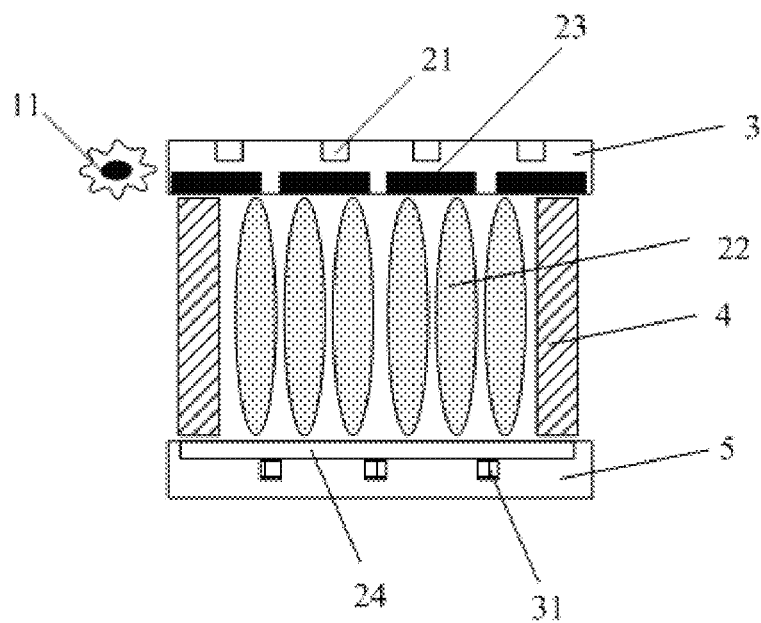

FIGS. 1A and 1B are structural schematic views showing an optical fingerprint identification assembly according to the first exemplary embodiment of the disclosure. As shown in FIGS. 1A and 1B, the optical fingerprint identification assembly includes: a light source component configured to provide a light source 11 to illuminate a fingerprint to be identified; a light screening component disposed at a downstream of the light source component in a light path and configured to collimate light emitted from the light source component, reflected by the fingerprint to be identified and entering the light screening component; and a fingerprint identification component disposed at a downstream of the light screening component and configured to receive the light collimated by the light screening component, so as to carry out fingerprint identification.

In the optical fingerprint identification assembly of the exemplary embodiment, there are fewer spacer layers between the finger and the fingerprint identification component, and the optical fingerprint identification assembly has the advantages of low cost, compact structure and better fingerprint identification effect.

In the exemplary embodiment, the light screening component includes a pair of electrodes, a light deflecting layer 22 and a light filtering layer 23.

In the exemplary embodiment, the pair of electrodes includes a first electrode 21 and a second electrode 24 respectively disposed at two sides of the light deflecting layer 22 to provide a light deflection control voltage for the light deflecting layer 22, and the light reflected by the fingerprint to be identified enters the fingerprint identification component after being adjusted by the light deflecting layer 22.

In the exemplary embodiment, the light filtering layer 23 may collimate the light emitted from the light source 11 as long as it is disposed closely adjacent to at least one side of the light deflecting layer 22. Then, the collimated light is adjusted by the light deflecting layer 22 and enters the fingerprint identification component in a direction perpendicular to the plane where the light filtering layer 23 is located.

In the exemplary embodiment, the fingerprint identification component includes a control element (not shown in FIGS. 1A and 1B) and a photosensitive device 31 connected in series.

In the exemplary embodiment, the optical fingerprint identification assembly further includes a first substrate 3 (typically a glass sheet) and a second substrate 5 disposed oppositely. The photosensitive device 31 of the fingerprint identification component is disposed in the second substrate 5. The pair of electrodes of the light screening component and the light filtering layer 23 are disposed in the first substrate 3 and the second substrate 5, and the light deflecting layer 22 of the light screening component is disposed between the first substrate 3 and the second substrate 5. The light source 11 is disposed outside a side of the first substrate 3, and the first substrate 3 is configured to guide light emitted from the light source 11 entering at the side of the first substrate 3.

As shown in FIG. 1A, the light screening component is disposed between the light source 11 and the photosensitive device 31 in the light path, and used for forming collimated light to ensure the fingerprint identification effect. The light screening component includes a first electrode 21, a light deflecting layer 22, a light filtering layer 23 and a second electrode 24 stacked from bottom to top sequentially. The fingerprint identification component is disposed at a downstream of the first electrode 21 in the light path. As discussed above, the light source 11 is disposed outside a side of the first substrate 3. Then, the first substrate 3 is equivalent to a light guide plate that may guide a light entering at the side. The light emitted from the light source component enters the fingerprint identification component in a direction perpendicular to the plane where the light filtering layer 23 is located after being reflected by the fingerprint to be identified and adjusted by the light deflecting layer 22.

In the exemplary embodiment, the light deflecting layer 22 is a liquid crystal adjusting layer, while the light filtering layer 23 is an opaque layer with a plurality of openings. The first electrode 21 and the second electrode 24 are configured to control whether to deflect liquid crystal molecules in an area of the liquid crystal adjusting layer corresponding to the first electrode 21, and the light deflected to be perpendicular to the plane where the light filtering layer 23 is located enters the light deflecting layer 22 and thus the fingerprint identification component through the openings.

In the optical fingerprint identification assembly of the exemplary embodiment, the photosensitive device 31 in the second substrate 5 corresponds to at least one of the openings. The fingerprint identification component receives the collimated light to obtain optical conditions for fingerprint identification.

In the exemplary embodiment, The plurality of openings of the light filtering layer 23 are arranged in an array and correspond to a plurality of the photosensitive devices 31 in the fingerprint identification component one by one; or one of the openings corresponds to a plurality of the photosensitive devices 31; or a plurality of openings correspond to one photosensitive device 31. Any one of the one-to-one, one-to-many and many-to-one structures of the openings and the photosensitive device 31 can ensure that the formed collimated light corresponds to a determined photosensitive device 31, thereby ensuring the fingerprint identification effect.

In the exemplary embodiment, the light filtering layer 23 is made of a black insulating material, for example, the material used to form a black matrix in color filter substrates. With the structure of the light filtering layer 23, the openings screen an incident light reflected by the fingerprint to be identified to form collimated light, thereby ensuring the fingerprint identification effect. Precision of the collimated light depends on a diameter of the openings. In the exemplary embodiment, the diameter of the openings in the light filtering layer 23 is in a range of 5~10 µm, which can ensure the fingerprint identification effect.

For the pair of electrodes forming an electric field that controls the deflection of the liquid crystal, the first electrode 21 has a plurality of stripe structures spaced apart and parallel to each other, while the second electrode 24 has a plane structure. According to the energization conditions of the first electrode 21 and the second electrode 24, collimated light is formed through the openings of the light filtering layer 23, and the deflection of the liquid crystal molecules in the liquid crystal adjusting layer of the light screening component is controlled to control passage of the light to obtain conditions for fingerprint identification.

Obviously, positions of the first electrode 21 and the second electrode 24 are not limited in the optical fingerprint identification assembly of this exemplary embodiment. As shown in FIG. 1B, the light screening component may include the second electrode 24, the light deflecting layer 22, the light filtering layer 23 and the first electrode 21 stacked from bottom to top sequentially; the fingerprint identification component is disposed below the second electrode 24; the light source 11 is disposed outside a side of the first substrate 3; and the light emitted from the light source 11 enters the fingerprint identification component in a direction perpendicular to the plane where the light filtering layer 23 is located after being adjusted by the light deflecting layer 22.

In FIGS. 1A and 1B, the first electrode 21 or second electrode 24 closer to the photosensitive device 31 is made of a transparent electrode material to ensure that the photosensitive device 31 can receive the light emitted by the light source 11 normally. The transparent electrode material includes at least one of Indium Gallium Zinc Oxide, Indium Zinc Oxide (IZO), Indium Tin Oxide (ITO) and Indium Gallium Tin Oxide.

In the optical fingerprint identification assembly of the exemplary embodiment, the light source 11 is an independent light source for fingerprint identification and disposed at an upstream of the light screening component in the light path, and the light emitted from the light source 11 enters the light screening component at a side. By providing light independently, providing a liquid crystal adjusting layer independently to control passage of light and providing a control electrode independently to control deflection of liquid crystal molecules and collimation of light, it is ensured that the light, after being reflected by the fingerprint to be identified, enters the liquid crystal adjusting layer and thus the photosensitive device 31, thereby realizing optical fingerprint identification at a distance.

The optical fingerprint identification assembly is packaged as a whole by a sealant 4.

Figure 2A:
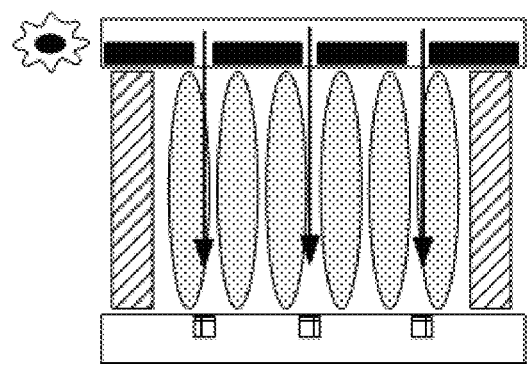
FIGS. 2A and 2B are schematic views showing the operating principle of the optical fingerprint identification assembly in FIG. 1A.
Figure 2B:
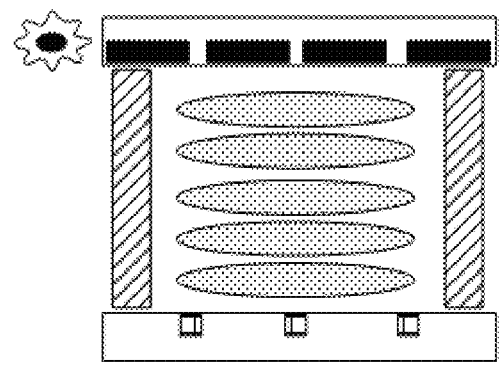

FIGS. 2A and 2B are schematic views showing the operating principle of the optical fingerprint identification assembly in FIG. 1A. As shown in FIGS. 2A and 2B (the first electrode 21 and the second electrode 24 are not shown in FIGS. 2A and 2B), the operating principle of the optical fingerprint identification assembly of the exemplary embodiment lies in that:

as shown in FIG. 2A, when fingerprint identification is desired, the fingerprint identification function is initiated, the light source 11 is turned on, and the electrodes of the light deflecting layer 22 are controlled to a higher voltage to cause deflection of the liquid crystal molecules; after light passes the light filtering layer 23 formed with openings, under a combined action of deflections of the liquid crystal molecules in the light deflecting layer 22, only quasi-collimated or collimated light can pass through to the photosensitive device 31 and thereby a fingerprint is sensed through changes in photocurrent of the photosensitive device 31.

As shown in FIG. 2B, when the fingerprint identification function is not desired, one way is closing the light source 11, and the other way is setting the electrodes controlling the light deflecting layer 22 to a lower voltage so as to prevent the liquid crystal molecules from deflecting, thereby preventing light from passing through to the photosensitive device 31.

The optical fingerprint identification assembly of the exemplary embodiment has the advantages of low cost, compact structure and good identification effect.

Second Exemplary Embodiment

According to one aspect of the disclosure, this exemplary embodiment provides an optical fingerprint identification assembly which solves the technical problems of, for example, the optical fingerprint identification function key of current display component terminals limited to the home key, poor integration of the sensor and the display component, too many spacer layers between the finger and the sensor, and poor fingerprint identification effect. The optical fingerprint identification assembly of this exemplary embodiment merely differs from the optical fingerprint identification assembly of the first exemplary embodiment in that: the light deflecting layer and the light filtering layer have a different stacked structure in the light screening component.

Figure 3A:
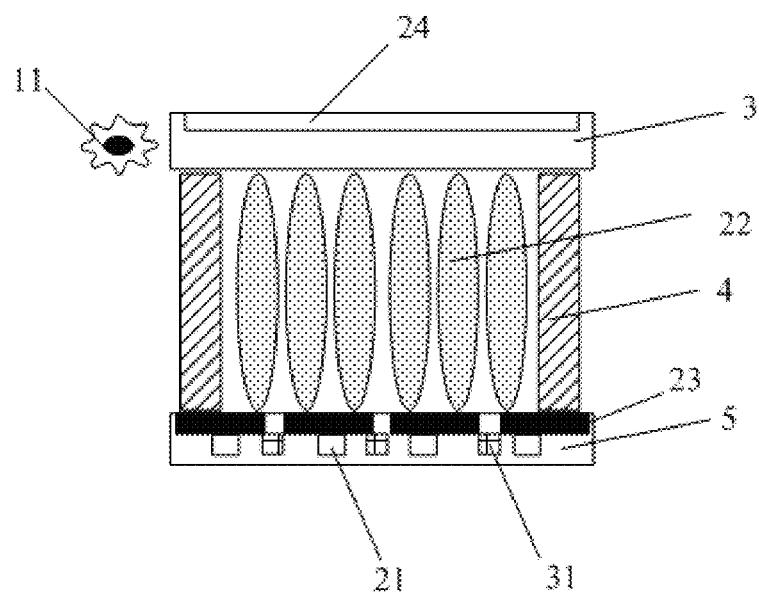
FIGS. 3A and 3B are structural schematic views showing an optical fingerprint identification assembly according to the second exemplary embodiment of the disclosure.
Figure 3B:
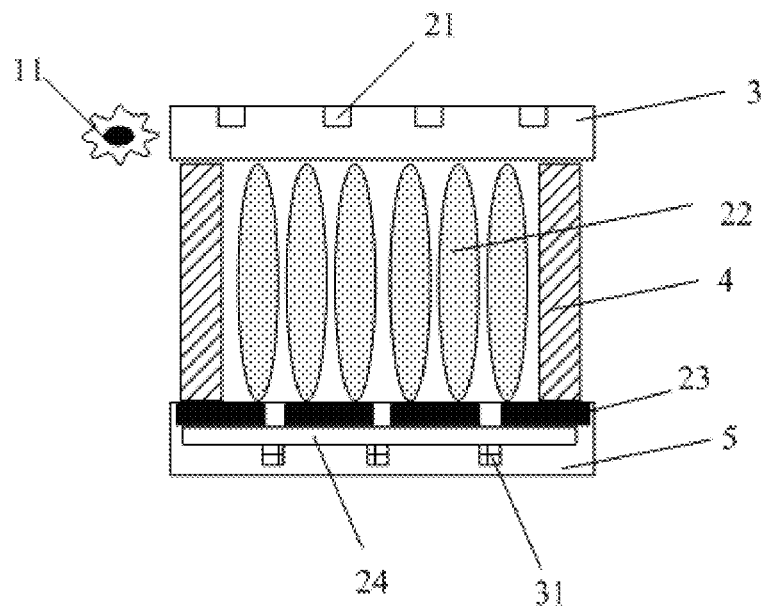

FIGS. 3A and 3B are structural schematic views showing an optical fingerprint identification assembly according to the second exemplary embodiment of the disclosure. In FIG. 3A, the light screening component and the fingerprint identification component of the optical fingerprint identification assembly are disposed in the first substrate 3 and the second substrate 5, or between the first substrate 3 and the second substrate 5 (i.e., taking the first substrate 3 and the second substrate 5 as external supports or interfaces). The light screening component is configured to form collimated light to ensure the fingerprint identification effect. The light screening component may include the first electrode 21, the light filtering layer 23, the light deflecting layer 22 and the second electrode 24 stacked from bottom to top sequentially; the fingerprint identification component is disposed at a downstream of the first electrode 21 in the light path; the light source 11 is disposed outside a side of the first substrate 3, and the light reflected by the fingerprint to be identified enters the fingerprint identification component in a direction perpendicular to the plane where the light filtering layer 23 is located after being adjusted by the light deflecting layer 22.

Obviously, positions of the first electrode 21 and the second electrode 24 are not limited in the optical fingerprint identification assembly of this exemplary embodiment. As shown in FIG. 3B, the light screening component may include the second electrode 24, the light filtering layer 23, the light deflecting layer 22 and the first electrode 21 stacked from bottom to top sequentially; the fingerprint identification component is disposed below the second electrode 24; the light source 11 is disposed outside a side of the first substrate 3, and the light emitted from the light source 11 enters the fingerprint identification component in a direction perpendicular to the plane where the light filtering layer 23 is located after being reflected by the fingerprint to be identified and adjusted by the light deflecting layer 22.

In FIGS. 3A and 3B, the first electrode 21 or second electrode 24 closer to the photosensitive device 31 is made of a transparent electrode material to ensure that the photosensitive device 31 can receive the light emitted by the light source 11 normally.

Respective layers in the optical fingerprint identification assembly of this exemplary embodiment have the same functions as corresponding layers in the optical fingerprint identification assembly of the first exemplary embodiment, thus will not be discussed in detail herein.

The optical fingerprint identification assembly of the exemplary embodiment has the advantages of low cost, compact structure and good identification effect.

Third Exemplary Embodiment

According to another aspect of the disclosure, this exemplary embodiment provides a display panel comprising the optical fingerprint identification assembly of the first or second exemplary embodiment, the optical fingerprint identification assembly being disposed in a non-display area of the display panel. By integrating the optical fingerprint identification assembly into the non-display area of the display panel, it not only ensures the identification precision and display effect in the display area, but also makes the whole display panel have a compact structure and low cost.

The display panel is a Liquid Crystal Display (LCD) or Organic Light Emitting Diode (OLED). The display panel may integrate the optical fingerprint identification assembly with the LCD or OLED. Thus, on one hand, a good fingerprint identification effect is provided; on the other hand, the preparation process is simplified since some steps of the preparation process may be completed in the same procedure.

Figure 4:
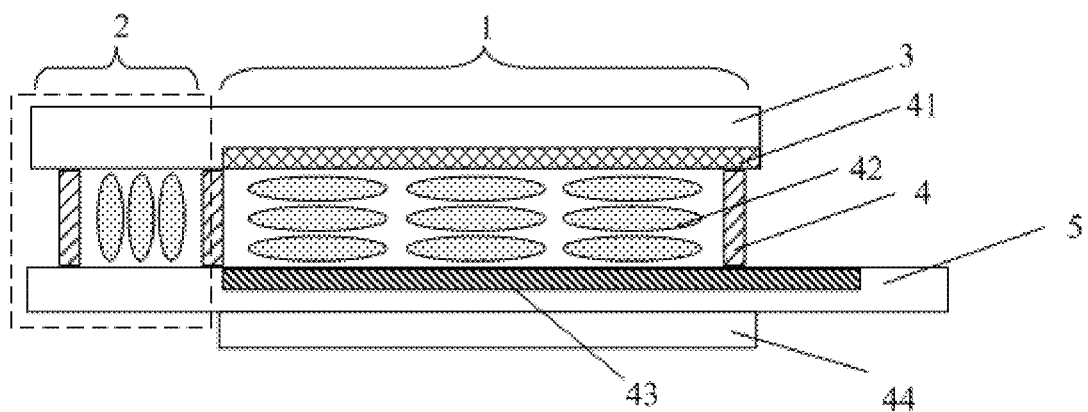
FIG. 4 is a structural schematic view showing a display panel according to the third exemplary embodiment of the disclosure.

FIG. 4 is a structural schematic view showing a display panel according to the third exemplary embodiment of the disclosure. Taking the display panel being a liquid crystal display as an example, the entire structure of the integrated body formed by the display panel and the optical fingerprint identification assembly is shown in FIG. 4. The integrated body includes a display area 1 for normal display, and a circuit area or blank non-display area 2 that provides a signal source for normal display. The display panel and the optical fingerprint identification assembly are disposed between the first substrate 3 (typically a glass sheet) and the second substrate 5. In the display area 1, sequential layers from a display side are a color filter substrate 41, a liquid crystal layer 42, an array substrate 43 and a frame 44 that are packaged by a sealant 4. In the exemplary embodiment, the color filter substrate 41 is provided with a common electrode, and a black matrix is normally arranged with pixels as a boundary. Red color resistance (R), green color resistance (G), and blue color resistance (B) are respectively and sequentially disposed in pixel areas between the black matrixes; and the array substrate 43 is provided with a thin film transistor array with corresponding pixels and connected to pixel electrodes.

During the preparation process, the optical fingerprint identification assembly may be disposed in the non-display area 2 of the liquid crystal display panel, and corresponding layer structures in the optical fingerprint identification assembly and in the liquid crystal display panel may be manufactured simultaneously through conventional manufactures of the liquid crystal display panel. For example, the first electrode in the optical fingerprint identification assembly and the common electrode in the liquid crystal display panel may be formed simultaneously, the light deflecting layer and the liquid crystal layer may be formed simultaneously (separated by a sealant 4), the light filtering layer and the black matrix may be formed simultaneously, the control element and the thin film transistor may be formed simultaneously, and the light source may be disposed at a side edge of the color filter substrate 41. For other aspects, reasonable process integrations may be made according to the specific structure of the display panel.

The display panel simplifies the manufacture process and reduces the cost of the entire device, greatly increases additional values of the display panel and enables the display panel to have an optical fingerprint identification function in addition to a display function.

Fourth Exemplary Embodiment

According to still another aspect of the disclosure, there is provided a display apparatus comprising the display panel of the third exemplary embodiment.

The display apparatus may be a liquid crystal display panel, an electronic paper, an OLED panel, a mobile phone, a tablet PC, a television, a monitor, a notebook computer, a digital photo frame, a navigator or any other product or component having a display function.

The display apparatus has an optical fingerprint identification function, thus can bring better operation experience to the user.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. An optical fingerprint identification assembly comprising:
   a light source component configured to provide a light source to illuminate a fingerprint to be identified;
   a light screening component disposed at a downstream of the light source component in a light path and configured to collimate light emitted from the light source component, reflected by the fingerprint to be identified and entering the light screening component; and a fingerprint identification component disposed at a downstream of the light screening component and configured to receive the light collimated by the light screening component, so as to carry out fingerprint identification, wherein the light screening component includes a pair of electrodes and a light deflecting layer, the pair of electrodes includes a first electrode and a second electrode respectively disposed at two sides of the light deflecting layer to provide a light deflection control voltage for the light deflecting layer, wherein the light reflected by the fingerprint to be identified enters the fingerprint identification component after being adjusted by the light deflecting layer, wherein the light screening component further includes a light filtering layer disposed closely adjacent to at least one side of the light deflecting layer and between the pair of electrodes, and the light reflected by the fingerprint to be identified is adjusted by the light deflecting layer and enters the fingerprint identification component in a direction perpendicular to a plane where the light filtering layer is located; and wherein the light deflecting layer is a liquid crystal adjusting layer, the light filtering layer is an opaque layer with a plurality of openings, the first and second electrodes are configured to control whether to deflect liquid crystal molecules in an area of the liquid crystal adjusting layer corresponding to the first electrode, and the light perpendicular to the plane where the light filtering layer is located enters the fingerprint identification component through the openings.

2. The optical fingerprint identification assembly according to claim 1,
wherein the fingerprint identification component includes a control element and a photosensitive device connected in series;
wherein the photosensitive device corresponds to at least one of the openings.

3. The optical fingerprint identification assembly according to claim 2,
wherein the plurality of openings are arranged in an array, and correspond to a plurality of the photosensitive devices one by one.

4. The optical fingerprint identification assembly according to claim 2,
wherein the plurality of openings are arranged in an array, and one of the openings corresponds to a plurality of the photosensitive devices.

5. The optical fingerprint identification assembly according to claim 2,
wherein the plurality of openings are arranged in an array, and correspond to one photosensitive device.

6. The optical fingerprint identification assembly according to claim 1,
wherein the first electrode has a plurality of strip structures spaced apart and parallel to each other; and
wherein the second electrode has a plane structure.

7. The optical fingerprint identification assembly according to claim 1,
wherein the light filtering layer is made of a black insulating material.

8. The optical fingerprint identification assembly according to claim 2,
wherein one of the first and second electrodes closer to the photosensitive device is made of a transparent electrode material.

9. The optical fingerprint identification assembly according to claim 1,
wherein the optical fingerprint identification assembly further includes a first substrate and a second substrate disposed oppositely, the fingerprint identification component is disposed in the second substrate, the pair of electrodes of the light screening component and the light filtering layer are disposed in the first and second substrates, the light deflecting layer of the light screening component is disposed between the first and second substrates, the light source component is disposed outside a side of the first substrate, and the first substrate is configured to guide the light emitted from the light source component entering at the side of the first substrate.

10. The optical fingerprint identification assembly according to claim 1,
wherein the first electrode, the light deflecting layer, the light filtering layer and the second electrode are stacked from bottom to top sequentially.

11. The optical fingerprint identification assembly according to claim 1,
wherein the second electrode, the light deflecting layer, the light filtering layer and the first electrode are stacked from bottom to top sequentially.

12. The optical fingerprint identification assembly according to claim 1,
wherein the first electrode, the light filtering layer, the light deflecting layer and the second electrode are stacked from bottom to top sequentially.

13. The optical fingerprint identification assembly according to claim 1,
wherein the second electrode, the light filtering layer, the light deflecting layer and the first electrode are stacked from bottom to top sequentially.

14. A display panel comprising the optical fingerprint identification assembly according to claim 1, the optical fingerprint identification assembly being disposed in a non-display area of the display panel.

15. A display apparatus comprising the display panel according to claim 14.

16. An optical fingerprint identification assembly comprising:
a light source component configured to provide a light source to illuminate a fingerprint to be identified;
a light screening component disposed at a downstream of the light source component in a light path and configured to collimate light emitted from the light source component, reflected by the fingerprint to be identified and entering the light screening component; and
a fingerprint identification component disposed at a downstream of the light screening component and configured to receive the light collimated by the light screening component, so as to carry out fingerprint identification,
wherein the light screening component includes a pair of electrodes and a light deflecting layer, the pair of electrodes includes a first electrode and a second electrode respectively disposed at two sides of the light deflecting layer to provide a light deflection control voltage for the light deflecting layer;
wherein the light reflected by the fingerprint to be identified enters the fingerprint identification component after being adjusted by the light deflecting layer;

wherein the first electrode has a plurality of strip structures spaced apart and parallel to each other; and wherein the second electrode has a plane structure.

17. The optical fingerprint identification assembly according to claim 16, wherein the light screening component further includes a light filtering layer disposed closely adjacent to at least one side of the light deflecting layer and between the pair of electrodes, and the light reflected by the fingerprint to be identified is adjusted by the light deflecting layer and enters the fingerprint identification component in a direction perpendicular to a plane where the light filtering layer is located.

18. The optical fingerprint identification assembly according to claim 17, wherein the light deflecting layer is a liquid crystal adjusting layer, the light filtering layer is an opaque layer with a plurality of openings, the first and second electrodes are configured to control whether to deflect liquid crystal molecules in an area of the liquid crystal adjusting layer corresponding to the first electrode, and the light perpendicular to the plane where the light filtering layer is located enters the fingerprint identification component through the openings.

19. The optical fingerprint identification assembly according to claim 18, wherein the fingerprint identification component includes a control element and a photosensitive device connected in series;

wherein the photosensitive device corresponds to at least one of the openings.

20. An optical fingerprint identification assembly comprising:

a light source component configured to provide a light source to illuminate a fingerprint to be identified;

a light screening component disposed at a downstream of the light source component in a light path and configured to collimate light emitted from the light source component, reflected by the fingerprint to be identified and entering the light screening component; and a fingerprint identification component disposed at a downstream of the light screening component and configured to receive the light collimated by the light screening component, so as to carry out fingerprint identification, wherein the light screening component includes a pair of electrodes and a light deflecting layer, the pair of electrodes includes a first electrode and a second electrode respectively disposed at two sides of the light deflecting layer to provide a light deflection control voltage for the light deflecting layer;

wherein the light reflected by the fingerprint to be identified enters the fingerprint identification component after being adjusted by the light deflecting layer, wherein the light screening component further includes a light filtering layer disposed closely adjacent to at least one side of the light deflecting layer and between the pair of electrodes, and the light reflected by the fingerprint to be identified is adjusted by the light deflecting layer and enters the fingerprint identification component in a direction perpendicular to a plane where the light filtering layer is located; and wherein the optical fingerprint identification assembly further includes a first substrate and a second substrate disposed oppositely, the fingerprint identification component is disposed in the second substrate, the pair of electrodes of the light screening component and the light filtering layer are disposed in the first and second substrates, the light deflecting layer of the light screening component is disposed between the first and second substrates, the light source component is disposed outside a side of the first substrate, and the first substrate is configured to guide the light emitted from the light source component entering at the side of the first substrate.

* * * * *